United States Patent
Jandhyam et al.

(10) Patent No.: US 8,880,745 B2
(45) Date of Patent: Nov. 4, 2014

(54) EFFICIENT SCHEDULING OF TRANSACTIONS FROM MULTIPLE MASTERS

(71) Applicant: Analog Devices, Inc., Norwood, MA (US)

(72) Inventors: Krishna S. A. Jandhyam, Bangalore (IN); Aravind K. Navada, Bangalore (IN)

(73) Assignee: Analog Devices, Inc., Norwood, MA (US)

( * ) Notice: Subject to any disclaimer, the term of this patent is extended or adjusted under 35 U.S.C. 154(b) by 69 days.

(21) Appl. No.: 13/645,971

(22) Filed: Oct. 5, 2012

(65) Prior Publication Data
US 2014/0101340 A1    Apr. 10, 2014

(51) Int. Cl.
*G06F 3/00*    (2006.01)
*G06F 13/00*   (2006.01)
*G06F 5/00*    (2006.01)
*G06F 3/06*    (2006.01)

(52) U.S. Cl.
CPC ................................. *G06F 3/0659* (2013.01)

USPC ........... 710/6; 710/5; 710/33; 710/40; 710/54

(58) Field of Classification Search
None
See application file for complete search history.

(56) References Cited

U.S. PATENT DOCUMENTS

2010/0312944 A1*  12/2010  Walker .............................. 711/5
2013/0297852 A1*  11/2013  Fai et al. ....................... 711/103

OTHER PUBLICATIONS

Non-Final Office Action for U.S. Appl. No. 13/645,969 mailed Nov. 29, 2013.
Final Office Action for U.S. Appl. No. 13/645,969 mailed May 7, 2014.

* cited by examiner

*Primary Examiner* — Idriss N Alrobaye
*Assistant Examiner* — Ronald Modo
(74) *Attorney, Agent, or Firm* — Patent Capital Group

(57) ABSTRACT

Data-transfer transactions from multiple masters may be balanced by taking snapshots of the transactions stored in a buffer, and executing transactions from each master back-to-back.

20 Claims, 4 Drawing Sheets

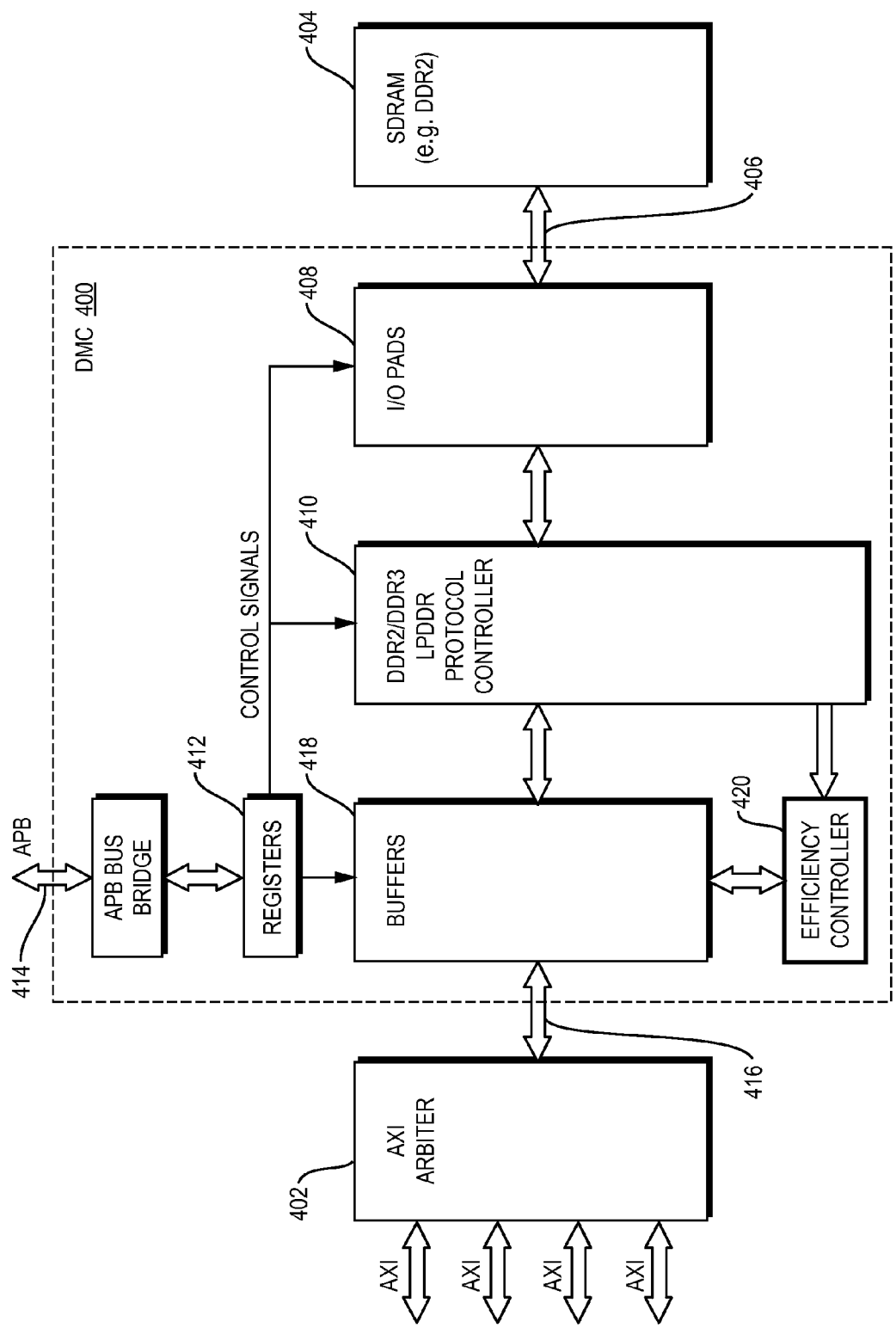

EFFICIENT SCHEDULING OF TRANSACTIONS FROM MULTIPLE MASTERS

CROSS-REFERENCE TO RELATED APPLICATION

Reference is made to related patent application entitled "Efficient scheduling of read and write transactions in dynamic memory controllers," Ser. No. 13/645,969, filed on even date herewith.

TECHNICAL FIELD

The present invention relates, generally, to scheduling data transfers from and to memory in an efficient manner. More specifically, various embodiments relate to dynamic memory controllers and associated methods of operation for efficiently scheduling transactions requested by multiple masters.

BACKGROUND

In many digital-logic systems, multiple sources, or "masters," share access to a common resource, or "slave." For example, multiple processors or local memories (examples of masters) of a "system on a chip" (SoC) may share an on-chip or off-chip main memory (an example of a slave). Data flow from and to the common memory is typically controlled by a dynamic memory controller (DMC). The DMC may, in a simple implementation, process requests from the masters in the order in which they are received, i.e., on a "first-come, first-served" basis. Often, however, the resulting order of transactions entails frequent switching between different masters and/or between read transactions and write transactions; switching is associated with a processing overhead that limits data throughput and, thus, the overall transfer rate. For example, when transferring data from and to dynamic random access memory (DRAM), switching from read to write transactions may carry an access-time penalty of seven clock cycles, and the reverse change in direction may carry a penalty of nine clock cycles; during this time, data transfer cannot take place.

Accordingly, it may be more efficient to process transactions out of order, e.g., to schedule transactions from the same master and/or in the same direction back-to-back. A commonly used architecture facilitating such out-of-order transaction execution is the Advanced Extensible Interface (AXI) defined under the Advanced Microcontroller Bus Architecture (AMBA). AXI enables association of an identification (ID) tag with each transaction; transactions having the same ID generally have internal dependencies and should be completed in order, whereas transactions having different IDs may be completed in any order. Thus, if different groups of IDs (which typically share a common ID portion) correspond to different masters requesting the respective transactions, AXI facilitates scheduling the transactions (via a suitable controller) in an order such that all transactions from the same master are completed before transaction processing moves on to the next master. Similarly, all read transactions may be executed before any write transactions are processed, or vice versa.

While scheduling all transactions in the same direction (or from the same master) in succession will generally maximize throughput, it can lead to starvation of the other direction (or of other masters). For example, as write transactions are executed, new write requests may continuously come in, and as a result, the read transactions may be delayed indefinitely. Accordingly, there is a need for scheduling approaches that balance read transactions and write transactions (or transactions from different masters) in a manner that optimizes the trade-off between throughput and the prevention of stalls in one direction (or starvation of some masters).

SUMMARY

The present invention relates to systems and methods for scheduling read and write transactions and/or transactions from multiple masters in a way that generally increases the overall data transfer rate (compared with processing requests simply in the order in which they are received) while assuring that both directions and/or all masters are serviced regularly. In various embodiments, balancing read and write transactions is accomplished by taking "snapshots" of all read and/or write transactions that are stored in a buffer (or buffers) and awaiting execution at a given point in time. (Conceptually, the "point in time" is an instant that demarcates the transactions stored in the buffer prior to the instant against those received in the buffer thereafter. Practically, taking a snapshot requires a very short period of time, typically (although not necessarily) less than a single clock cycle. If, while the snapshot is taken, new transactions are received in the buffer(s), these transactions may simply be ignored until the next snapshot; in other words, the snapshot captures only transactions whose storage in the buffer(s) has been completed by the time the snapshot commences.) Among the transactions identified in the snapshot, all transactions in one direction (i.e., all read transactions or all write transactions) are executed "back-to-back," i.e., one after the other, without any transactions in the opposite direction (i.e., without any write transactions or read transactions, respectively), before taking any further snapshot For example, following a snapshot identifying the read transactions, these transactions are executed before the write transactions are processed. Advantageously, processing transactions in this manner reduces the read and write turnaround times for data transfer over the bus(es). In some embodiments, the process alternates between taking a snapshot of the read transactions and executing them, and taking a snapshot of the write transactions and executing them. In other embodiments, read and write transactions are captured in the same snapshot, and all transactions in one direction are executed, followed by all transactions in the other direction, before the next snapshot is acquired. Further, in some embodiments, after completion of a snapshot, another snapshot is taken in the same direction; this can happen multiple times before moving to the other direction. The number of snapshots taken in the same direction can be the same for both directions or different for read and write directions.

In various embodiments, the transactions within each snapshot are scheduled so as to further optimize memory access times. For example, if a snapshot includes read requests from multiple masters, requests from the same master may be executed back-to-back, without regard to the order in which the transactions were received from the multiple masters. Further, transactions involving access to a memory segment (e.g., a particular "page" in DRAM) that is already open (e.g., as a consequence of a transaction of the previous snapshot accessing the same segment) are given priority over transactions that require closing a previously accessed memory segment and opening a new one. Further optimization approaches, including many strategies known to persons of skill in the art, can be integrated into snapshot methods for scheduling read and write transactions in accordance herewith.

In some embodiments, a snapshot is taken for transactions from multiple masters. The order in which these transactions are executed is determined, first, based on the master requesting the transaction and, second and optionally, based on the direction of the transaction. Thus, both read and write transactions (or other types of transactions, such as interrupt commands) from one master are processed before the next master's requests are serviced. Among the transactions for one master, read and write transactions may (but need not) be scheduled such that all read transactions are handled first, before the write transactions are processed, or vice versa.

Accordingly, in a first aspect, the invention is directed to a method of scheduling data-transfer transactions in two directions. The method includes receiving data-transfer transactions from at least one master, each transaction being either a transaction in a first direction or a transaction in a second direction different from the first direction, and storing the transactions (e.g., in a buffer). The transactions in the first direction may be read transactions and the transactions in the second directions may be write transactions, or vice versa. The method further includes identifying all transactions in the first direction among the transactions cumulative stored at a first point in time, identifying all transactions in the second direction among the transactions cumulatively stored at a second point in time, executing all of the identified transactions in the first direction before executing any transactions in the second direction, and thereafter executing all of the identified transactions in the second direction. The steps of identifying transactions in each direction and executing them may be repeated.

In some embodiments, the transactions in both direction are identified (i.e., a snapshot, or snapshots, of both directions is or are taken) before any of the identified transactions are executed. Further, in certain embodiments, the first point in time is equal to the second point in time, i.e., the transactions in both direction are identified in the same snapshot. In other embodiments, the first point in time is different from the second point in time, and the transactions in the first direction are executed before the transactions in the second direction are identified. Further, in some embodiments, transactions are received from two or more masters; the transactions in one direction from each master may be executed back-to-back, without intervening transactions from other masters.

In another aspect, the invention provides a system for scheduling data-transfer transactions in two directions. The system includes a buffer for receiving and storing data-transfer transactions (each transaction being either a transaction in a first direction or a transaction in a second direction different from the first direction). The buffer may include separate buffers for data transfers in the first direction and data transfers in the second direction. Further, it may include an address buffer, a data buffer, and/or a control buffer.

The system further includes an efficiency controller for (i) identifying all transactions in the first direction among the transactions cumulatively stored in the buffer at a first point in time, (ii) identifying all transactions in the second direction, among the transactions cumulatively stored in the buffer at a second point in time, (iii) causing execution of all of the identified transactions in the first direction before executing any transactions in the second direction, and (iv) thereafter causing execution of all of the identified transactions in the second direction. The efficiency controller may be configured to repeat steps (i) through (iv). In some embodiments, the efficiency controller is configured to execute the transactions in the first direction before identifying the transactions in the second direction, and in other embodiments, it is configured to identify the transactions in both direction before executing the transactions in either direction.

The system may further include a protocol controller for data transfer to a slave. It may also include an AXI interface for receiving data-transfer transactions from a plurality of masters for storage in the buffer. The buffer may be configured to store, along with each data-transfer transaction, an ID of the master from which it is received, and the efficiency controller may be configured to execute, while executing transactions in one direction, the transactions from each master back-to-back, without intervening transactions from other masters.

In yet another aspect, the invention is directed to a method of scheduling data-transfer transactions in two directions which includes (a) receiving data-transfer transactions from at least one master, each transaction being either a read transaction or a write transaction, and storing the transactions in a buffer, (b) identifying, among the transactions cumulatively stored in the buffer at a first point in time, all read transactions; (c) identifying, among the transactions cumulatively stored in the buffer at a second point in time, all write; (d) executing all of the identified read transactions back-to-back without intervening write transactions; and (e) executing all of the identified write transactions back-to-back without intervening read transactions.

In a further aspect, the invention provides a method of scheduling data-transfer transactions requested by a plurality of masters. The method involves receiving and storing data-transfer transactions from the plurality of masters (and, in some embodiments, storing them in a buffer); identifying, among the transactions cumulatively stored at a first point in time, all transactions from a first one of the masters and, among the transactions cumulatively stored at a second point in time, all transactions from a second one of the masters; and executing all of the identified transactions from the first master and, thereafter, executing all the transactions from the second master. The first and second points in time may be the same point in time, and the transactions from both first and second masters may be identified prior to execution of the transactions. Alternatively, the transactions from the first master may be identified at a first point in time and executed, and then the transactions from the second master may be identified at a second point in time and executed. The steps of executing, first, all transactions from the first master and, then, all transactions from the second master may be repeated for the transactions cumulatively stored at respective later points in time. Further, the method may be extended to three or more masters, where the transactions requested by each master are executed back-to-back, without interruptions by transactions from other masters. Additionally, in some embodiments, all transactions from the first master in a first direction (e.g., the read direction) are executed before all transactions from the first master in a second direction (e.g., the write direction) are executed.

In another aspect, the invention relates to a system for scheduling data-transfer transactions requested by a plurality of masters. The system includes a buffer (which may include an address buffer, a data buffer, and/or a control buffer) for receiving and storing data-transfer transactions from the plurality of masters. The buffer may be configured to store, with each data-transfer transaction, an ID of the master from which it is received. The system also includes an efficiency controller for causing execution, among the transactions cumulatively stored in the buffer at a first point in time, of all transactions from a first one of the masters and thereafter causing execution, among the transactions cumulatively stored in the buffer at the first or a second point in time, of all transactions from a second one of the masters (and so on for optionally third and further masters). The efficiency controller may be configured to cause, among the transactions from any master (e.g., the first master), execution of all transaction in one direction before it causes execution of the transactions in the other direction; the buffer may include separate buffers for the transactions in the two directions. Further, the efficiency controller may be configured to repeat causing back-to-back execution of the transactions from the first master, and then the second master, at subsequent points in time. In some embodiments, the system also includes a protocol controller for data transfer to a slave, and/or an AXI interface for receiving the data-transfer transactions from the plurality of masters for storage in the buffer.

In a further aspect, the invention relates to a system for scheduling data-transfer transactions requested by a plurality of masters. The system includes a buffer for receiving and storing data-transfer transactions from the plurality of masters and an efficiency controller. The efficiency controller is configured to identify all transactions cumulatively stored in the buffer at a first point in time, and, among the identified transactions, executing, for each of the plurality of masters, all transactions from that master back-to-back without intervening transactions from other masters.

BRIEF DESCRIPTION OF THE DRAWINGS

The foregoing can be more readily understood from the following detailed description, in particular, when taken in conjunction with the drawings, in which:

FIG. 4 is a block diagram illustrating a dynamic memory controller in accordance with various embodiments.

DETAILED DESCRIPTION

Figure 1:
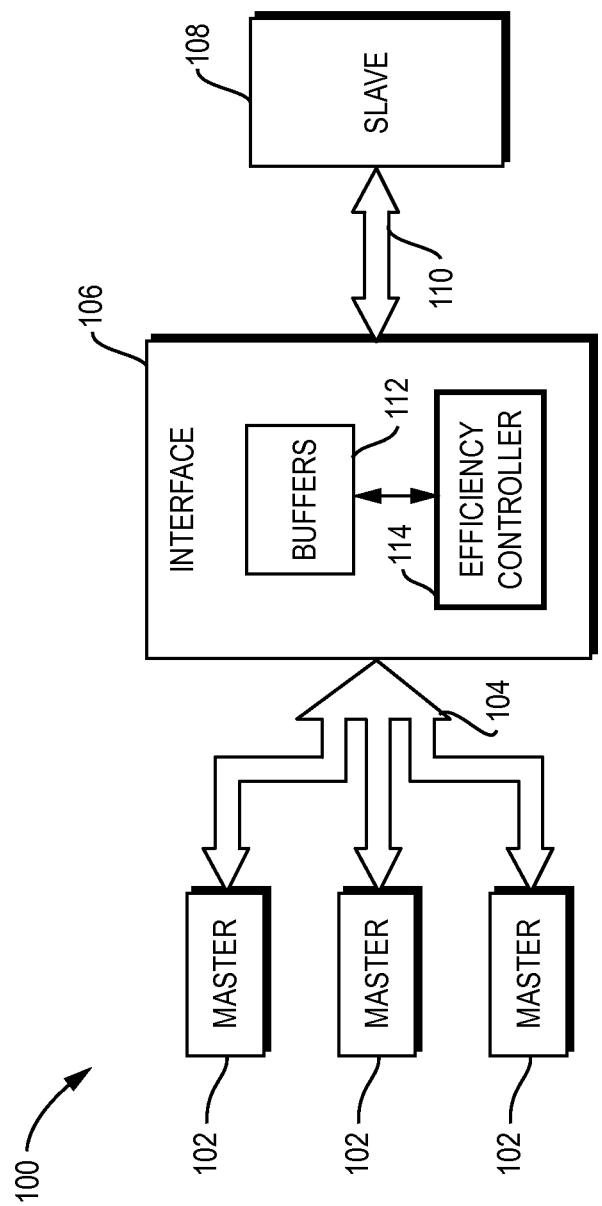
FIG. 1 is a block diagram illustrating a master/slave bus architecture in accordance with various embodiments.

FIG. 1 illustrates an exemplary master-slave interface 100. A number of masters 102 (such as processors, direct memory access controllers (DMA) to local memories, chaches, peripheral devices such as, cameras (still and video), display monitor or, generally, any devices providing data) communicate over one or more system buses 104 (such as an AXI bus or any other SoC bus) with an interface unit 106. A slave 108 (such as, e.g., the system's main memory or, generally, any high-latency data source, bus, or other connection, particularly, any off-chip memory or off-chip bus), in turn, communicates with the interface unit 106 (which may, e.g., be a DMC) via a bus or local link 110. FIG. 1 shows three masters 102 and a single slave 108, but any number of masters 102 and slaves 108 is within the scope of the current invention. In systems with multiple masters 102 or multiple slaves 108, the bus 104 and/or the link 110 may each be a network or "fabric" of bus connections connecting the various components.

The master(s) 102 may send read or write requests (as well as other commands, such as interrupt requests) over the bus 104, and the interface unit 106 receives the requests and fulfills them by forwarding them to the slave 108. While in the simplest case the interface unit may be configured to merely forward the requests to the slave 108 as they are received, the illustrated interface unit 106 includes one or more buffers 112 (or other means of temporary storage) to store the incoming transactions and execute them at a later point in time. A buffer, as used herein, denotes any means for data storage, and may be implemented in any kind of storage medium, device, or structure, including, for example, one or more partitions or sections in a random-access memory, hardware registers, flip-flops, latches, or any combination thereof. The buffer need not be a single, contiguous unit, but may comprise multiple portions in different memory locations. Further, it may include store data directly, or indirectly via pointers to separate memory locations. In various embodiments of the present invention, the interface 106 further includes an efficiency controller 114, which determines the order in which transactions are processed, as described in detail below. The efficiency controller 114 may be integrated into the interface unit 106, as shown, or provided as a separate component in communication with interface unit 106.

The bus 104 may deliver transactions from the masters 102 in the form of read addresses and/or write addresses and associated write data (each transaction possibly having control/status information bundled therein). Write transactions and read transactions are generally stored in two different buffers, each of which may, itself, comprise multiple buffers storing different types of information. In the case of an incoming write transaction, a data buffer may be used to store the incoming write data, an address buffer may be used to store the incoming write addresses, and a control buffer may be used to store the incoming control/status information (e.g., an ID tag). Similarly, in the case of an incoming read transaction, address and control buffers may be used to store the incoming read address and control/status information, and a data buffer may be used to hold the read data once it is read out from the slave 108. The particular arrangement of the buffers is, however, not meant to be limiting, and any combination or permutation of the three types of buffers is within the scope of the current invention.

Figure 2:
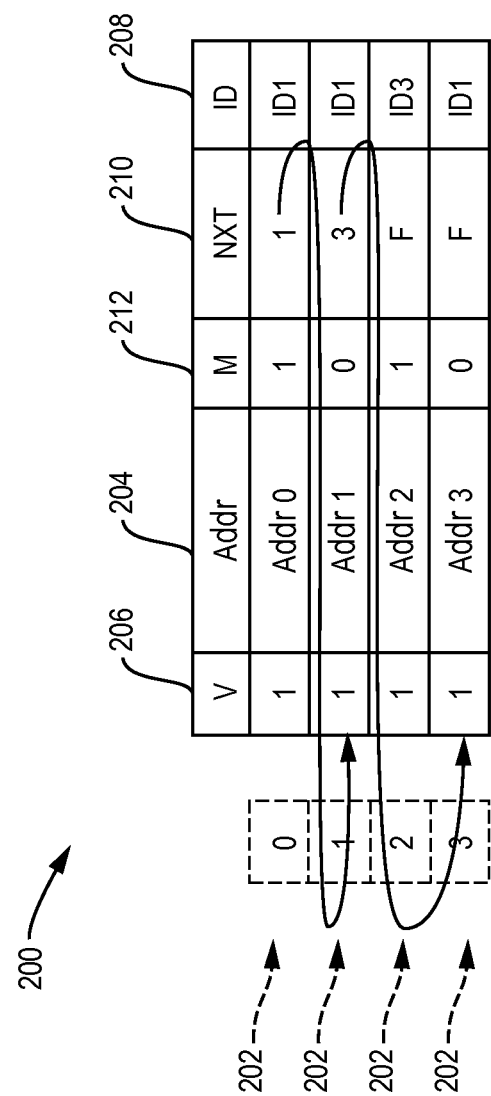
FIG. 2 illustrates an address buffer in accordance with various embodiments.

FIG. 2 illustrates an exemplary address buffer 200 (which could be used for either read or write data). The buffer 200 includes multiple buffer slots 202 for address entries, each corresponding to a separate transaction. (The associated data buffer includes the same number of corresponding data slots, each storing the data for a respective transaction.) In the example shown, the address buffer 200 can have up to four entries; however, the buffer may, generally, have any number of slots (e.g., 5, 6, 8, 16, etc.), which may (but need not) differ between read and write buffers. Each slot includes a field 204 for the (memory) address to which data is to be written or from which it is to be read, as well as a field 206 for a Boolean parameter indicating whether the entry is "valid." A valid entry (indicated as "1") corresponds to a stored transaction that is ready for execution and has a valid address; an invalid entry corresponds to empty slots or, slots storing addresses for transactions that have not yet been buffered in full (e.g., write transactions for which data is still in the process of being written to the data buffer). Further, once a transaction has been executed, e.g., write data has been sent to the resource 108 or read data has been received from the resource 108 and passed on to the requesting source 102, the "valid" bit is reset to "invalid" (i.e., zero). The address buffer 200 may also incorporate control information or, alternatively, pointers to respective entries in a separate control buffer. For example, as illustrated in FIG. 2 and explained in more detail below, the address buffer may include additional fields that facilitate specifying the order in which valid transactions are executed.

Figure 3:
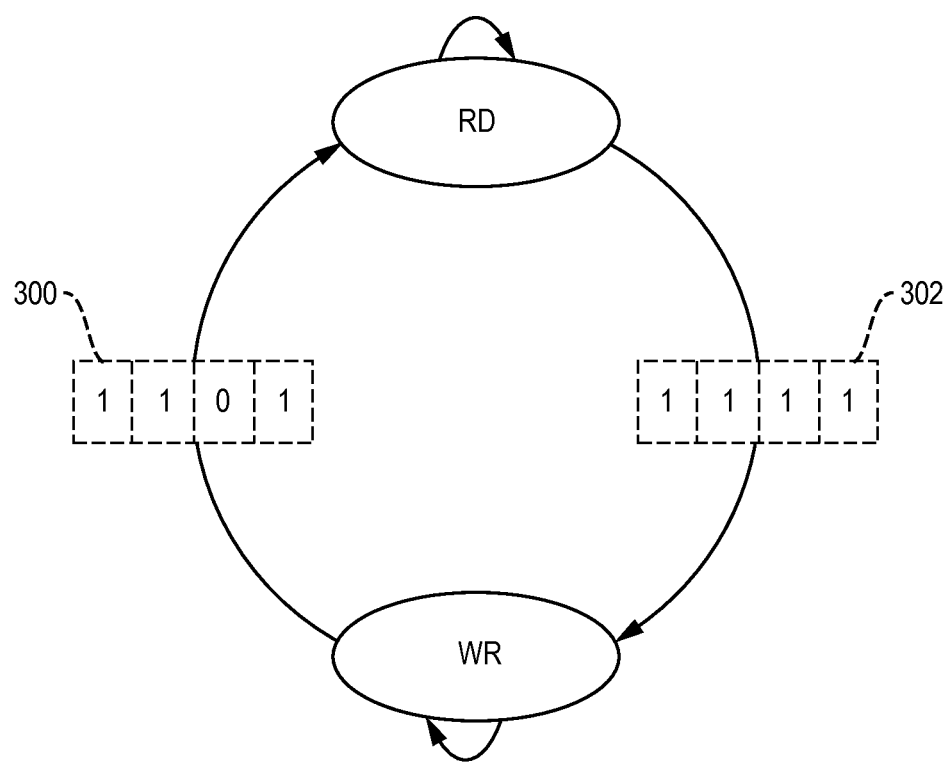
FIG. 3 illustrates, in the form of a state-machine, the scheduling of read and write transactions in accordance with various embodiments.

FIG. 3 illustrates, in the form of a state machine, how read and write transactions are, in accordance with various embodiments, scheduled based on snapshots. When the efficiency controller 114 takes a snapshot of the transactions stored in the buffer 112 at a certain point in time, it typically stores the buffer locations of all valid (read and/or write) transactions in a register. The register may have a size n equal to the depth (i.e., the number of slots) of the address buffer, and may store the locations of the valid transactions in the form of an n-digit binary number where each digit indicates whether the respective transaction is valid. In the example shown, both the read-transaction register 300 and the write-transaction register 302 have four digits. (In general, the registers for the read transactions and the write transactions may have different sizes, corresponding to the respective buffer depths. The size of the register determines the maximum number of consecutive transactions in one direction.) The read snapshot in register 300 is "1101," indicating that address-buffer entries 0, 2, and 3 have valid transactions, whereas address-buffer entry 1 does not.

The efficiency controller 114 may, in general, begin with a snapshot for either direction (which it may pick, e.g., randomly, based on an external signal, or based on a predetermined hardwired selection). For illustration, assume that the efficiency controller starts with a snapshot of the read transactions. Once the active read transactions have been identified in the snapshot, they are sent to the slave 108. Whenever a transaction has been sent, it gets invalidated in the buffer 112, and a new transaction can be stored at that buffer location. While the transfer of read transactions is going on, one or more new transaction may be saved in the read buffer, e.g., at location 1 (which was previously inactive) or at any of the other locations once they have freed up. These new transactions will not affect the snapshot previously taken, and will not be executed until they are captured in a later snapshot. When processing of the read transactions is complete, the efficiency controller 114 takes a snapshot of the valid transactions in the write buffer, provided that valid write requests are available. (If the write buffer does not contain any valid write transactions, the efficiency controller 114 proceeds with another snapshot in the read direction. Further, if the read direction does not have any valid transactions either, the efficiency controller 114 waits for a valid transaction to be available in either direction before proceeding to take a snapshot in that direction.) The valid write request are then sent to the slave 108, and, again, any incoming write transactions are ignored for the time being. Once the transactions in the write snapshot have been executed, the efficiency controller again reverses direction, and acquires a new snapshot of the read transactions, and so on. In other words, the efficiency controller alternates between capturing and executing read transactions, and capturing and executing write transactions.

The scheduling process described above may be modified in various ways. For example, multiple snapshots of transactions in the same direction may be captured and processed before the efficiency controller 114 switches to the opposite direction. This way, the maximum number of back-to-back transactions in the same direction can be increased beyond the physical limits of the snapshot registers. If, for example, for each direction, three snapshots are taken consecutively, the maximum number of consecutive transactions in one direction is three times the size n of the register. Further, rather than executing the read transactions of a first snapshot before taking a second snapshot capturing write transactions (or vice versa), as described above, the read and write transactions may be captured in a single snapshot (or, in other words, snapshots for the two directions may be taken at substantially the same time). Then, the transactions in the snapshot are executed, first all transactions in one direction, followed by all transactions in the other direction. Thereafter, another snapshot may be taken. The number of snapshots in the read direction may be different from the number of transactions in the write direction.

The overall data-transfer rate may be further increased by efficiently scheduling the transactions in the same direction within each snapshot. For example, the efficiency controller may assure that transaction requests from the same master, or requests to access the same memory location, are processed back-to-back, as is best explained with reference to a particular implementation.

Refer to FIG. 4, which illustrates a DMC 400 that interfaces, at one side, with an AXI arbiter 402 and, on the other side, with synchronous DRAM 404 (SDRAM) or some other (typically off-the-shelf, off-chip) memory. The SDRAM may, for example, be double-data-rate (e.g., DDR, DDR2, DDR3, LPDDR, or LPDDR2) memory, as is commercially widely available, and may be mounted off-chip and connected via an off-chip bus 406 to the input/output pads 408 of the DMC chip. The DMC 400 may include a driver or protocol controller 410 that implements the data-transfer protocols required by the memory 404. Preferably, the protocol controller 410 facilitates protocols for multiple frequently used types of memory (e.g., DDR2/DDR3/LPDDR), rendering the DMC compatible with all of these types; such protocol controllers 410 are standard components known to persons of skill in the art. The protocol controller 410 may receive control signals from registers 412 populated by an advanced peripheral bus 414 (APB, a microprocessor bus of the AMBA architecture).

The DMC receives, via its AXI interface 416, read and write transaction requests from multiple masters, each having an ID associated with it. These transactions are stored in respective data, address, and/or control buffers 418, preferably in a manner that is easy to process by the efficiency controller 420. The efficiency controller 420 takes snapshots of the buffered transactions, as described above, and determines the order in which transactions are executed based on the information stored in the buffer 418 itself and/or information it receives from the protocol controller 410 (e.g., an indication which portions of the SDRAM are still open from a previous access, or the burst length of the SDRAM, i.e., the number of data items that may be sent to the same address). When a transaction is scheduled for execution, the efficiency controller 420 causes transfer of the transaction (i.e., of a read command or of a write command and associated write data) from the buffer 418 via the protocol controller 410 to the SDRAM 404.

Referring again to FIG. 2, the address buffer 200 may store, along with each transaction, the ID 208 of the master requesting it. In the illustrated example, transactions 0, 1, and 3 belong to the same master, whereas transaction 2 comes from another master. The efficiency controller 420 may use this information to process transaction requests from the same master back-to-back.

In some embodiments, the transactions received from a particular master are to be executed in a specified order, e.g., in the order in which they are received. This order may be recorded in the address buffer 200 in the form of a linked list of dependent transactions, where, for each transaction, a link to the immediately following transaction is stored in a "next" field 210. In the illustrated example, transaction 0 links to transaction 1, which, in turn, links to transaction 3. Since transaction 3 is the last transaction in the list, its next field is marked as "F" or "final." Address buffer 200 further includes a mask bit 212, which identifies the first transaction, or "head," of each linked list (e.g., transaction 0 for ID1) by leaving it unmasked (corresponding to bit value "1") while masking all subsequent transactions (corresponding to bit value "0"). Transaction 3, which is the only transaction received from the master with ID3, is both unmasked and marked as final. In general, when a transaction is received at the buffer whose ID is equal to that of any other entry, the new transaction is linked to the end of the list of existing entries and masked. Only unmasked entries are available for execution at any given time. Once an unmasked transaction has been executed, the mask bit for the next transaction in the linked list is de-asserted, and the transaction becomes eligible for execution. Thus, the efficiency controller may execute the list of transactions back-to-back in the correct order.

Whenever transactions from multiple masters (captured within the same snapshot) are awaiting execution, the efficiency controller 420 may arbitrate between them based on the status of the portion of the SDRAM (or other memory) each needs to access. DRAM is generally organized into banks, and each bank is further organized into multiple pages. When data is written to or read from a page, the page needs to be opened, a write or read command must be sent, and, finally, the data itself needs to be transferred. Each of these steps requires a certain number of clock cycles to be completed. If the page to be accessed is still open from the preceding transaction (which is commonly referred to as a "page hit"), the time otherwise required to open the page can be saved. On the other hand, if another page is open from the preceding transaction, that page first needs to be closed (a step referred to as "precharging") before the new page can be opened, adding additional time to the transaction. Accordingly, the DRAM access time depends on the previously executed transaction, and can be minimized through successive accesses to the same page. In various embodiments, the efficiency controller 420 takes this into account by giving priority, among multiple transactions from different masters, to transactions that will result in a page hit.

As will be readily appreciated by persons of skill in the art, the various scheduling schemes described above may be combined or modified in various ways. For example, rather than scheduling transactions at the first level based on their direction, and at the second level, within a group of transactions in the same direction, based on their origination from different masters, the reverse may be done, i.e., all (read and write) transactions requested by the same master may be executed back-to-back, without interruptions from other masters, and within the transactions from the same master, read and write transactions may be grouped so as to minimize changes in the direction of data transfer. For example, if transaction requests are received from three different masters, they may be stored on an ongoing basis in one or more buffers 112, e.g., in an address buffer and associated data and control buffers. As depicted in FIG. 2, the address buffer 200 may include ID fields 208 indicating, for each transaction, the master requesting it. In one embodiment, the efficiency controller 114 takes a snapshot of all valid transactions stored in the buffer(s) 112 at a certain point in time, and then causes execution of all transactions from the first master, followed by all transactions from the second master, followed by all transactions from the third master. Transaction requests received after the snapshot has been taken are stored in the buffer(s) 112, but are not processed until all transactions in the snapshot have been processed, and a subsequent snapshot been taken. (If read and write transactions are stored in separate buffers, each snapshot taken by the efficiency controller 114 may include snapshots of both the read buffer and the write buffer.) In an alternative embodiment, the efficiency controller cycles through the different masters, taking a snapshot of all transactions from the first master and processing them, then taking a snapshot of all transactions from the second master and processing them, etc. In either embodiment, transaction requests from the same master may be executed without regard to the type of transaction, such as whether it is a read or write transactions. Preferably, however, all read and all write transactions are grouped together so as to minimize inefficiencies due to frequent changes in the data transfer direction.

Further, to accommodate urgent requests that should not be delayed until processing of the preceding snapshot has been completed, transactions may be associated with an "urgent" bit that, if asserted, overrides the scheduling process to the extent that it increases the priority of the urgent transaction. Further detail about systems (e.g., DMCs) and methods for scheduling bus transactions can be found in U.S. patent application Ser. No. 13/422,021, filed on Mar. 16, 2012, which is hereby incorporated herein by reference.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claim is:

1. A method of scheduling data-transfer transactions requested by a plurality of masters, the method comprising:
   (a) receiving and storing data-transfer transactions from the plurality of masters;
   (b) identifying, among the transactions cumulatively stored at a first point in time, all transactions from a first one of the masters;
   (c) identifying, among the transactions cumulatively stored at a second point in time, all transactions from a second one of the masters;
   (d) executing all of the identified transactions from the first master before executing any transactions from the second master, ignoring any transactions received from the first master subsequent to (b); and
   (e) thereafter, executing all of the identified transactions from the second master, ignoring any transactions received from the second master subsequent to (c).

2. The method of claim 1, further comprising repeating steps (b) through (e).

3. The method of claim 1, wherein step (c) precedes step (d).

4. The method of claim 3, wherein the first point in time is equal to the second point in time.

5. The method of claim 1, wherein the first point in time is different from the second point in time and wherein step (d) precedes step (c).

6. The method of claim 1, further comprising, within step (b), executing all transactions from the first master in a first direction before executing all transactions from the first master in a second direction different from the first direction.

7. The method of claim 1, further comprising:
   (f) identifying, among the transactions cumulatively stored at a third point in time, all transactions from a third one of the masters; and
   (g) after steps (d) and (e), executing all of the identified transactions from the third master.

8. The method of claim 1, wherein the transactions are stored in a buffer.

9. A system for scheduling data-transfer transactions requested by a plurality of masters, the system comprising:
- a buffer for receiving and storing data-transfer transactions from the plurality of masters; and
- an efficiency controller for:
  - (i) identifying, among the transactions cumulatively stored in the buffer at a first point in time, all transactions from a first one of the masters;
  - (ii) identifying, among the transactions cumulatively stored in the buffer at a second point in time, all transactions from the second one of the masters;
  - (iii) causing execution of all of the identified transactions from the first master before executing any transactions from the second master, ignoring any transactions received from the first master subsequent to (i); and
  - (iv) thereafter, causing execution of all of the identified transactions from the second master ignoring any transactions received from the second master subsequent to (ii).

10. The system of claim 9, wherein the efficiency controller is further configured to cause execution, among the transactions from the first master, of all transactions in a first direction before causing executing of all transactions in a second direction different from the first direction.

11. The system of claim 10, wherein the buffer comprises separate buffers for data transfers in the first direction and data transfers in the second direction.

12. The system of claim 9, wherein the buffer comprises at least two of an address buffer, a data buffer, or a control buffer.

13. The system of claim 9, further comprising a protocol controller for data transfer to a slave.

14. The system of claim 9, further comprising an AXI interface for receiving the data-transfer transactions from the plurality of masters for storage in the buffer.

15. The system of claim 14, wherein the buffer is configured to store, along with each data-transfer transaction, an ID of the master from which it is received.

16. The system of claim 9, wherein the efficiency controller is configured to repeat steps (i) through (iv).

17. The system of claim 9, wherein the efficiency controller is configured to execute step (ii) before step (iii).

18. The system of claim 9, wherein the efficiency controller is configured to execute step (iii) before step (ii).

19. The system of claim 9, wherein the efficiency controller is further configured to identify, among the transactions cumulatively stored at a third point in time, all transactions from a third one of the masters; and, after execution of the transactions from the first and second masters, cause execution of all of the identified transactions from the third master.

20. A system for scheduling data-transfer transactions requested by a plurality of masters, the system comprising:
- a buffer for receiving and storing data-transfer transactions from the plurality of masters; and
- an efficiency controller for:
  - (i) identifying all transactions cumulatively stored in the buffer at a first point in time, and
  - (ii) among the identified transactions, executing, for each of the plurality of masters, all transactions from that master back-to-back without intervening transactions from other masters, ignoring any transactions received from that master subsequent to the first point in time.

* * * * *